United States Patent
Dege

(10) Patent No.: US 9,771,144 B2
(45) Date of Patent: Sep. 26, 2017

(54) HIGH LIFT SYSTEM FOR AN AIRCRAFT, AIRCRAFT HAVING A WING AND A HIGH LIFT SYSTEM AND METHOD FOR MOVING A HIGH LIFT SURFACE RELATIVE TO THE WING OF AN AIRCRAFT

(71) Applicant: Airbus Operations GmbH, Hamburg (DE)

(72) Inventor: Saskia Dege, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 19 days.

(21) Appl. No.: 14/719,864

(22) Filed: May 22, 2015

(65) Prior Publication Data

US 2015/0360769 A1     Dec. 17, 2015

(30) Foreign Application Priority Data

Jun. 11, 2014   (EP) .................................... 14171960

(51) Int. Cl.
*B64C 9/02*     (2006.01)
*B64C 13/28*    (2006.01)
(Continued)

(52) U.S. Cl.
CPC ............... *B64C 13/28* (2013.01); *B64C 9/02* (2013.01); *B64C 13/42* (2013.01); *B64D 2045/001* (2013.01)

(58) Field of Classification Search
CPC ...... B64C 13/42; B64C 9/02; B64D 2045/001
(Continued)

(56) References Cited

U.S. PATENT DOCUMENTS 4,498,647 A * 2/1985 Boehringer ............... B64C 9/02
                                                          244/213
4,688,744 A * 8/1987 Aldrich .................. B64C 13/28
                                                          244/213
(Continued)

FOREIGN PATENT DOCUMENTS

DE         3505839 A1    8/1986
DE     102012020820 A1   4/2014
(Continued)

OTHER PUBLICATIONS

European Patent Office, European Search Report for European Patent Application No. 14171960.9 dated Nov. 18, 2014.

*Primary Examiner* — Brian M O'Hara
*Assistant Examiner* — Keith L Dixon
(74) *Attorney, Agent, or Firm* — Lorenz & Kopf, LLP

(57) ABSTRACT

A high lift system for an aircraft, comprises a drive unit, a high lift surface, at least one primary drive station, each primary drive station having a shaft connection couplable with the drive unit and a primary lever couplable with the high lift surface. The high lift system further comprises at least one secondary unit, each secondary unit having a secondary lever couplable with the high lift surface. Each one of the at least one primary drive station is adapted for moving the respective primary lever on driving the shaft connection, and each one of the at least one secondary unit comprises a selectively activatable brake, such that the secondary lever follows the motion of the one of the at least one high lift surface when the brake is deactivated.

10 Claims, 3 Drawing Sheets

(51) Int. Cl.
*B64C 13/42* (2006.01)
*B64D 45/00* (2006.01)

(58) Field of Classification Search
USPC .......................................................... 244/213
See application file for complete search history.

(56) References Cited

U.S. PATENT DOCUMENTS

| | | | | | |
|---|---|---|---|---|---|
| 4,779,822 | A * | 10/1988 | Burandt | ................. | B64C 13/34 |
| | | | | | 244/213 |
| 4,909,364 | A * | 3/1990 | Grimm | .................. | F16D 11/14 |
| | | | | | 192/108 |
| 7,048,234 | B2 * | 5/2006 | Recksiek | .............. | B64C 13/503 |
| | | | | | 244/213 |
| 7,051,975 | B2 * | 5/2006 | Pohl | .......................... | B64C 9/16 |
| | | | | | 244/213 |
| 7,464,896 | B2 * | 12/2008 | Carl | .......................... | B64C 5/10 |
| | | | | | 244/99.2 |
| 7,878,459 | B2 * | 2/2011 | Mabe | ........................ | B64C 9/32 |
| | | | | | 244/213 |
| 9,260,181 | B2 * | 2/2016 | Conrad | .................... | B64C 13/28 |
| 2005/0151028 | A1 * | 7/2005 | Pohl | ........................ | B64C 13/26 |
| | | | | | 244/213 |

FOREIGN PATENT DOCUMENTS

| | | | |
|---|---|---|---|
| EP | 1878658 | A2 | 1/2008 |
| GB | 1575512 | A | 9/1980 |
| GB | 2449172 | A | 11/2008 |

* cited by examiner

HIGH LIFT SYSTEM FOR AN AIRCRAFT, AIRCRAFT HAVING A WING AND A HIGH LIFT SYSTEM AND METHOD FOR MOVING A HIGH LIFT SURFACE RELATIVE TO THE WING OF AN AIRCRAFT

CROSS-REFERENCE TO RELATED APPLICATIONS

This application claims priority of European Patent Application No. 14171960.9, filed 11 Jun. 2014, which is incorporated herein by reference in its entirety.

TECHNICAL FIELD

The embodiments described herein relate to a high lift system for an aircraft, an aircraft having a wing and such a high lift system as well as to a method for moving a high lift surface relative to the wing of an aircraft.

BACKGROUND

High lift systems of an aircraft provide the ability to selectively increase the active surface area and the camber of a wing through extending high lift surfaces movably mounted thereon. These may include leading edge slats and trailing edge flaps. With extended high lift surfaces, the lift coefficient of the aircraft may be drastically increased to permit low flight velocities, especially during descent and landing.

In common commercial aircraft, a trailing edge flap system often comprises a central drive unit, which is also known as power control unit (PCU), for transferring rotational power to drive stations, which are distributed in the wing to move the trailing edge flaps. The transfer of rotational power is conducted through a continuous transmission shaft system that extends into the wing by reaching through all drive stations. A safety brake and a monitoring system are usually mechanically coupled with the transmission shaft. Further safety brakes and monitoring sensors are integrated in the drive unit.

Some high lift systems may require dual load paths for the high lift surfaces. The drive stations often comprise geared rotary actuators, which may provide two independent drive or load paths, in order to increase the safety and prevent catastrophic failures under any circumstances. So far, all dual load path solutions for a high lift system comprises duplicate drive elements, which are synchronized with the primary drive elements. They require additional passive brakes and need to be tested for dormant failures. Furthermore, additional system brakes are required within the system.

In addition, other objects, desirable features and characteristics will become apparent from the subsequent summary and detailed description, and the appended claims, taken in conjunction with the accompanying drawings and this background.

SUMMARY

It is an object of the embodiment to provide a dual load path solution for a high lift system of an aircraft, which provides a simple failure detection and eliminates maintenance tests.

This object is met by a high lift system having the features of independent claim 1. Advantageous embodiments and further improvements may be gathered from the sub-claims and the following description.

A high lift system for an aircraft is proposed, that comprises a drive unit, at least one high lift surface, and at least one primary drive station, wherein each primary drive station has a shaft connection couplable with the drive unit and a primary lever couplable with one of the at least one high lift surfaces. The high lift system further comprises at least one secondary unit, each secondary unit having a secondary lever couplable with one of the at least one high lift surfaces. Each one of the at least one primary drive station is adapted for moving the respective primary lever on driving the shaft connection. Further, each of the at least one secondary units comprises a selectively activatable brake, such that the secondary lever follows the motion of the one of the at least one high lift surface when the brake is deactivated and such that the secondary lever arrests the motion of the one of the at least one high lift surface when the brake is activated.

It is therefore proposed to use a combination of primary drive stations and secondary units, wherein the primary drive station is dedicated to conducting the active motion of the respective high lift surface, i.e. the primary unit is a drive station. For this purpose, the primary drive station is couplable with the drive unit, which may be a central drive unit (PCU) residing in a center region of the aircraft. Such a primary drive station may comprise a geared rotary actuator, which is adapted for extending or retracting the primary lever to extend or retract the respective high lift surface.

Contrary to this, the secondary unit is not directly coupled with the drive unit, but instead simply follows the motion of the respective high lift surface. This means, that the secondary lever, which is coupled to the respective high lift surface, conducts the same motion as the primary lever only through being connected to the respective high lift surface.

A core aspect of this high lift system is the fact that the secondary unit is adapted for selectively arresting the passively conducted motion of the secondary lever by activating a brake residing in the secondary unit. This means that, for example, when the primary drive station stops its motion induced by the drive unit, the secondary unit may simply arrest the high lift surface in its momentary position. Consequently, even if there may be any failure in relation with the coupling between the primary drive station and the drive unit, the respective high lift surface position may reliably be maintained.

The secondary unit not being coupled with the drive unit is advantageous as it is completely independent from any failure of a transmission shaft system or the drive unit and thereby clearly increases the safety of the high lift system without needing any central or additional brakes, depending on the number of secondary units installed in the system.

In this regard, it is noted that the brakes of the secondary units in such a high lift system may be used for several different situations. During the normal operation, the brake in a secondary unit allows to firmly arrest the extended or retracted high lift surface, such that a transmission shaft system and the primary drive stations do not need to continuously carry and/or compensate the air and mass loads on the high lift surfaces. Further, especially in case the high lift system is continuously monitored for failures, the individual secondary units may activate their brakes in case a failure is detected in the high lift system.

Consequently, the secondary units provide a second load path for achieving a required level of redundancy. The design of the secondary drive units is simple and the complexity is low, leading to reduced manufacturing and maintenance costs.

Another great advantage lies in the fact that the brakes in the secondary units are continuously used during normal operation, such that their function is always known throughout the normal operation of the aircraft. The danger of dormant failures may thereby drastically be reduced.

In an advantageous embodiment, each one of the at least one high lift surface is coupled with two individual primary drive stations and at least one secondary unit. Coupling a high lift surface with two primary drive stations allows to extend and retract the high lift surface without any skew. However, a single secondary unit may be sufficient for providing an arresting function, especially when it is installed in a middle section of a high lift surface. Further, an additional system brake, which is couplable with both primary drive stations, may increase the reliability, while the system complexity is even further reduced.

The use of two primary drive stations furthermore allows to drive the respective high lift surface individually, when at least one individual drive unit is coupled with the two primary drive stations. In this case, the secondary unit may reside somewhere between the two primary drive stations.

In a still further advantageous embodiment, the drive unit is coupled to the at least one primary drive station by means of a transmission shaft, wherein the transmission shaft is coupled to a brake for arresting the rotation of the transmission shaft. Here, a reduction of the number of required secondary units may be accomplished, as the brake may provide for a backup brake or as a primary brake, in an alternating manner together with the brake in the secondary unit. The position of the brake may be arbitrarily chosen. If the transmission shaft belongs to a continuous transmission shaft train extending through the whole wing, the brake may be positioned basically anywhere on the transmission shaft. However, the brake may be arranged between two primary drive stations of the same high lift surface or of adjacent high lift surfaces.

In a still further advantageous embodiment, each one of the at least one high lift surface is coupled with two primary drive stations and two secondary units. The installation of two secondary units allows dealing with a plurality of different failure situations only through these four devices. For example, if one of the primary levers loses a connection to the respective primary drive station, a secondary unit may arrest the high lift surface, which is associated with the primary lever that has a failure. Also, after extending or retracting the respective high lift surface, the two secondary units for safely arrest the respective high lift surface in the momentary position without skewing.

In a preferred embodiment, a secondary lever is positioned directly adjacent to a primary lever. Consequently, the load introduction positions of the primary and the secondary lever are almost the same and the forces on the high lift surface structure that arise in an arrested position hardly differ from the forces acting on it during the extension or retraction process.

It may be particularly useful if a group of primary drive stations, the group comprising at least two primary drive stations, comprises an individual drive unit. The integration of a drive for a high lift surface allows a clear reduction of necessary transmission shaft lengths, as two primary drive stations of a high lift surface may be coupled to an individual drive unit, while the high lift surface is also coupled with one or two secondary units. Besides the ability to provide differential surface settings, it may also be possible to arrest jammed high lift surfaces and continue a high lift surface operation with the remaining high lift surfaces. However, in these cases, a symmetrical high lift surface extension should be preferred.

The high lift system preferably comprises a controller, which is coupled with sensors for detecting operation parameters, such as loads, speeds or positions, wherein the controller is configured for arresting a brake in at least one of the at least one secondary unit, in case the controller determines a failure in the system. The determination may be based on a comparison of desired operation parameters such as loads, speeds or positions, with the measured operation parameters. As explained previously, the secondary units not only provide the arresting of an associated high lift surface during normal operation, but also provide for arresting at least a part of the high lift system in any failure case. In this regard, loads may include forces on the primary or the secondary levers, which may be measured by strain gauges. For example, if a secondary lever should be responsible for holding at least one edge of a high lift surface in a certain control situation and if a respective force sensor on this secondary lever does not measure any substantial force, the controller may determine that a failure occurred in this load path. This determination may also be supported by measuring forces on a primary lever, which in this case may provide a substantial force even if the primary lever does not face a substantial load. It is understood, that this may also be conducted the other way around or in all possible combinations. As an alternative or additionally thereto, sensors may be provided for measuring positions, which may include position values delivered by a station position pick-off unit arranged in the primary drive stations and/or by feedback position pickoff units located in the drive unit. With this position information, skew or jam cases are detectable. Through the use of such a plurality of sensors, the controller may always determine whether a predetermined operation of the high lift system is successful or whether a failure occurs. These failures may ultimately lead to a selective operation of a brake in at least one and preferably all secondary units in an affected region. However, if a further brake outside any secondary unit is present, the controller may also be adapted for activating this particular additional brake, preferably in alternating cycles to the secondary unit. A regular application of all brakes is thereby ensured, which is advantageous, as dormant failures are prevented.

In a still further advantageous embodiment, at least one of the at least one primary drive station is coupled with the drive unit by means of a transmission shaft, wherein at least one of the at least one secondary unit comprises a through-hole, through which the transmission shaft extends. This allows for a compact setup and eliminates any changes in the extension direction of the transmission shaft and furthermore allows for basically the same dimensions of the primary drive stations and the secondary units.

It is noted that the brake in the secondary unit may be coupled with the secondary lever through a gear having a certain gear ratio or it may be coupled with the secondary lever directly, depending on the expected load. The secondary unit needs to be able to freely move during an extension and a retraction motion of the respective high lift surface, until the brake is applied.

The embodiments described herein relate to an aircraft having a wing and at least one such high lift system.

In an advantageous embodiment, the aircraft comprises a central drive unit located in a wing root region, as well as a transmission shaft system extending into the wing and reaching through all primary drive stations.

Still further, the embodiment also relates to a method for moving a high lift surface relative to a wing of an aircraft. The method basically comprises the steps of driving at least one primary drive station coupled with a high lift surface by means of a primary lever, until a predetermined position is reached, and activating a brake in a secondary unit, which is coupled to the high lift surface by means of a secondary lever.

The method may further comprise detecting at least one operation parameter, in particular a load, speed or position of a primary drive station or a secondary unit and determining whether intended operation parameters are achieved and, in case of deviations between the intended operation parameters and the measured operation parameters arresting at least one of the at least one secondary unit.

BRIEF DESCRIPTION OF THE DRAWINGS

The various embodiments will hereinafter be described in conjunction with the following drawing figures, wherein like numerals denote like elements, and.

DETAILED DESCRIPTION

Figure 1A:
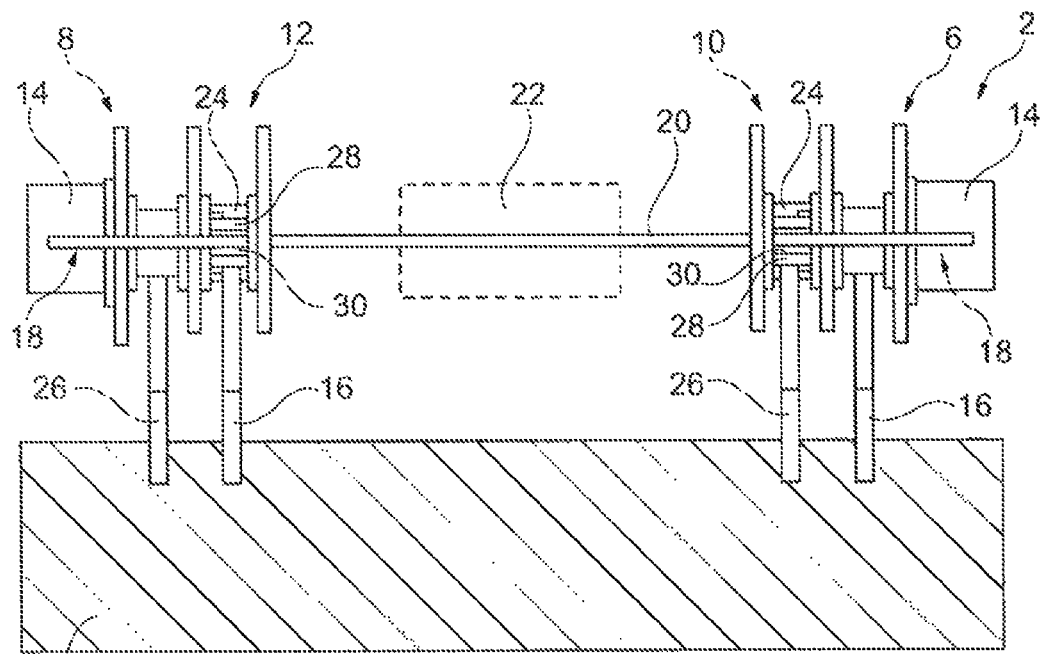
FIGS. 1A-1F show a first exemplary embodiment in a schematic view with a number of different operation and failure cases.

The following detailed description is merely exemplary in nature and is not intended to limit the disclosed embodiments or the application and uses thereof Furthermore, there is no intention to be bound by any theory presented in the preceding background detailed description.

FIGS. 1A-1F shows a part of a first exemplary embodiment of a high lift system 2 in a schematic view. Here, a high lift surface 4 is present, to which a first primary drive station 6, a second primary drive station 8, a first secondary unit 10 and a second secondary unit 12 are coupled.

Each of the two primary drive stations 6 and 8 comprises a geared rotary actuator 14, which is coupled with a primary lever 16. The geared rotary actuators 14 comprise a shaft connection 18, coupled with a transmission shaft 20 being driven by a drive unit. This drive unit may be a central drive unit located at a clear distance to the arrangement shown or it may be an individual drive unit 22 indicated with dashed lines between the two secondary units 10 and 12.

By driving the transmission shaft 20, the geared rotary actuators 14 are provided with a torque, which is transferred into an extension motion or a retracting motion of the primary levers 16. Hence, by driving the transmission shaft 20, high lift surface 4 is extended or retracted.

The secondary units 10 and 12 are passive and comprise a brake 24, which is coupled with a secondary lever 26 connected to the high lift surface 4. This may be conducted directly or through a gear having a certain gear ration, depending on the expected loads. The brakes 24 may selectively be activated, such that a motion of the secondary lever 26, which follows the extension or retraction motion of high lift surface 4, may be arrested, which leads to an arrested high lift surface 4.

In the example shown in FIG. 1A, the secondary units 10 and 12 comprise bearings 28, having a through-hole 30, through which the transmission shaft 20 extends. Consequently, the secondary units 10 and 12 are completely independent from the rotational motion of transmission shaft 20. The working principle of the arrangement of FIG. 1A is shown in FIGS. 1B to 1F.

Figure 1B:
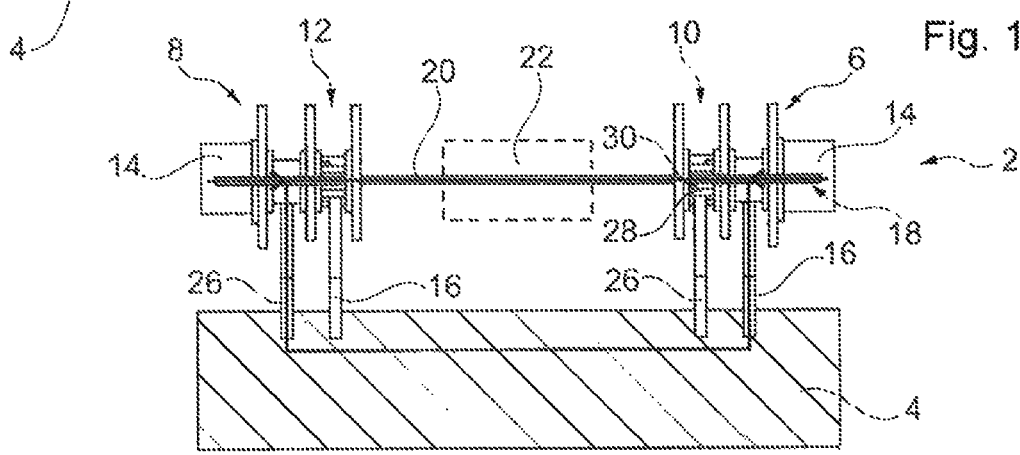

In FIG. 1B, the transfer of torque from the transmission shaft 20 to the primary drive stations 6 and 8 as well as the load path from these to the primary levers 16 and high lift surface 4 is shown. In the depicted case, the load distribution during an extension or retraction motion of high lift surface 4 is demonstrated. Here, the secondary units 10 and 12 are completely passive and simply follow the motion of the high lift surface 4.

Figure 1C:
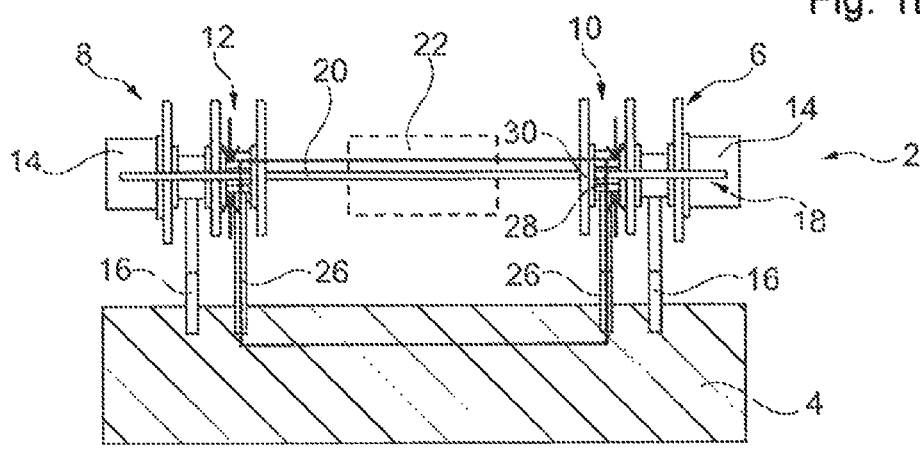

After reaching a predetermined position of the high lift surface 4, the brakes 24 in the secondary units 10 and 12 are activated, as seen in FIG. 1C, such that the position of the secondary levers 26 are arrested, which leads to arresting the high lift surface 4. As the brakes 24 are continuously used during the normal operation of the aircraft, their operability state is always known to a central controller, such that no surprising, dormant failures may affect the safety operation.

Figure 1D:
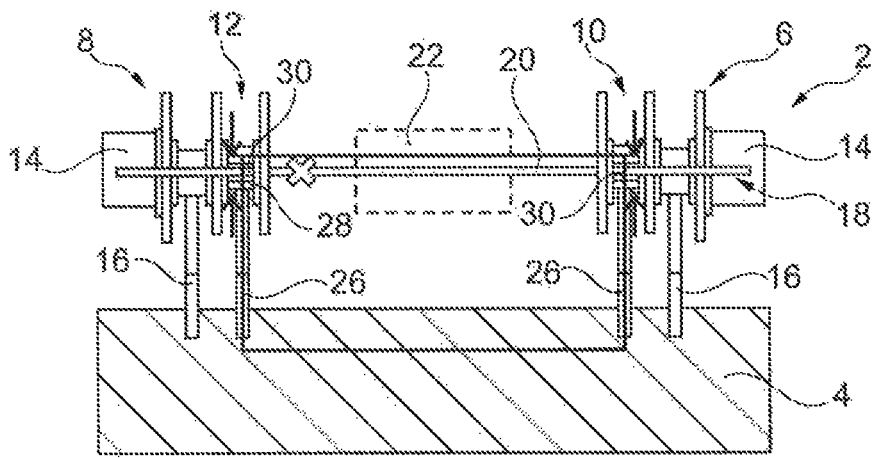

In FIG. 1D, a possible failure of the transmission shaft 20 is demonstrated, indicated by a cross. Such a failure may be detected through monitoring rotational position of the transmission shaft 20 through e.g. a feedback position pickoff unit, which is not explicitly shown in these figures. If the rotational position of the transmission shaft 20 does not correspond to a desired position, it may be concluded that a failure of the transmission shaft 20 occurred. Hence, through activating the brakes 24 in the secondary units 10 and 12, the high lift surface 4 may be arrested in its momentary position reliably, as the secondary units 10 and 12 are completely independent from transmission shaft 20.

Figure 1E:
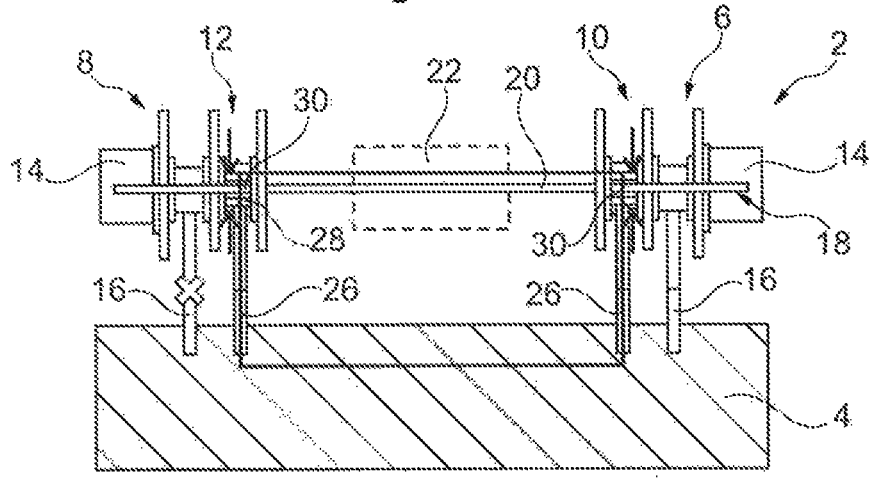

In FIG. 1E, another possible failure is shown. Here, the primary lever 16 from the second primary drive station 8 has lost a connection to the high lift surface 4. Such a failure may be detected through monitoring a load and/or a position and/or a speed or other suitable operation parameters on the primary levers 16 or a component coupled thereto. Through arresting the brakes 24 in the secondary units 10 and 12, the high lift surface 4 may reliably arrested in its momentary position.

Figure 1F:
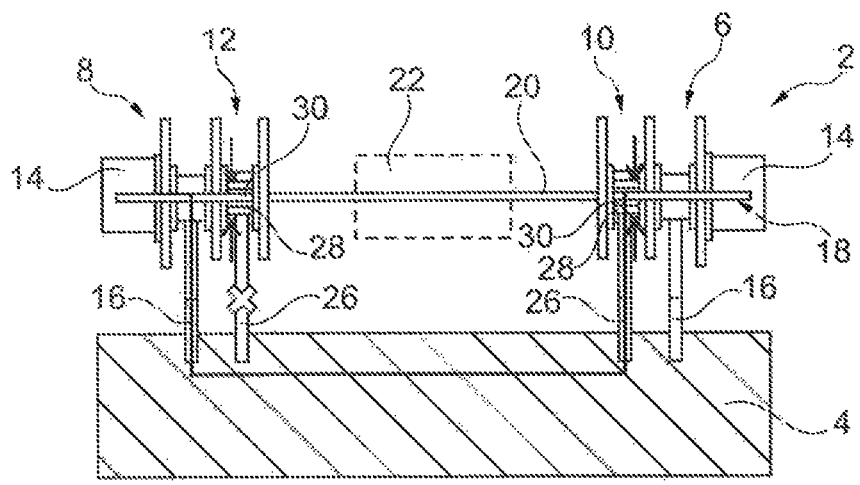

However, in case a secondary lever loses connection to the high lift surface 4, as shown in FIG. 1F, the high lift surface 4 may be arrested through the remaining secondary unit 10 and the associated primary drive station 8.

Another exemplary embodiment of a part of a high lift system 32 having two primary drive stations 34 and 36, a single secondary unit 38 and an additional brake 40. The two primary drive stations 34 and 36 are arranged at two distanced lateral positions on the high lift surface 4, while the secondary unit 38 is positioned between both primary drive stations 34 and 36. Exemplarily, the additional brake 40 is located between the secondary unit 38 and the first primary drive station 34. However, the additional brake 40 may also be arranged at the space between the secondary unit 38 and the second primary drive station 36 or at a completely other position.

Such a high lift system 32 may conduct the same operation as the high lift system 2 of the previous figures. However, as only a single secondary unit 38 is present, it should be positioned somewhere in the middle of the high lift surface 4 in order to be able to arrest the high lift surface 4 without risking a skewing motion and/or for reducing loads. For failure cases of the secondary unit 38 itself, the additional brake 40 is adapted for arresting a transmission shaft 42 that powers the primary drive stations 34 and 36.

Hence, the high lift surface 4 may in this case be held by the primary drive stations 34 and 36 through the brake 40.

Figure 2:
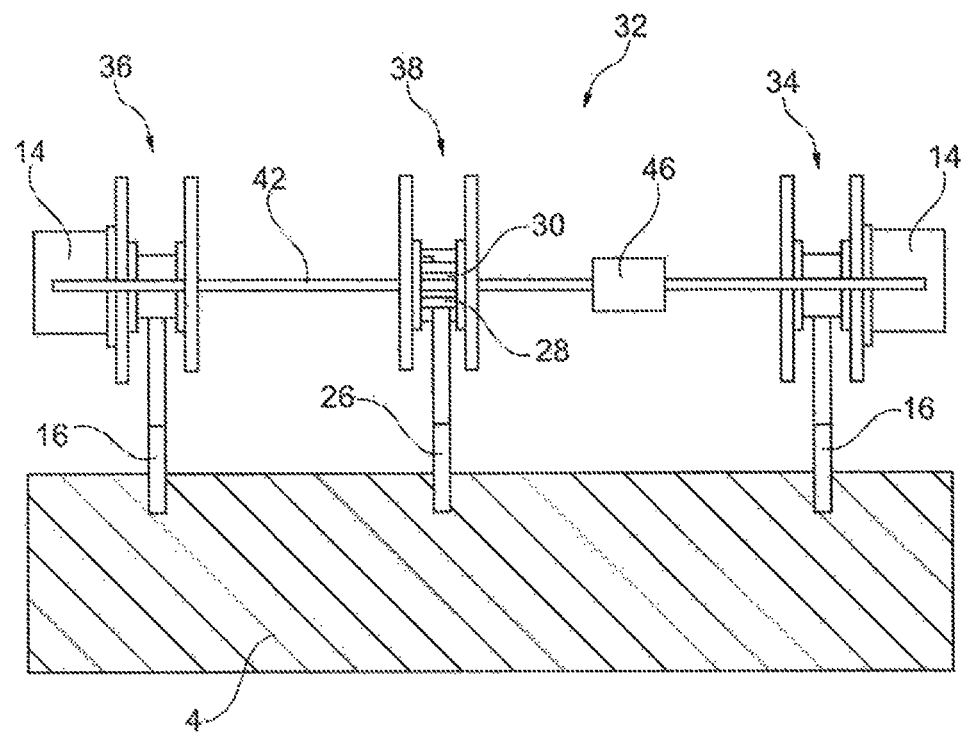
FIG. 2 shows a second exemplary embodiment in a schematic view.
Figure 3:
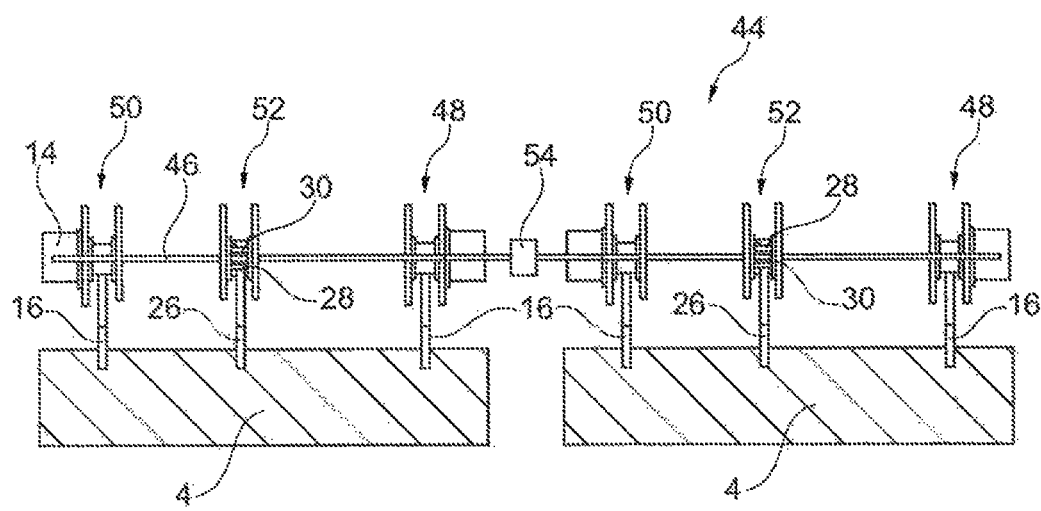
FIG. 3 shows a third exemplary embodiment comprising commonly driven high lift surfaces in a schematic view.

In a still further embodiment, a high lift system 44 is shown that comprises a transmission shaft 46 extending through primary drive stations 48 and 50 of two adjacent high lift surfaces 4, which are also connected to a single secondary unit 52 located approximately in the middle of the respective high lift surface 4. Hence, the setup of each high lift surface 4 is comparable to the setup shown in FIG. 2. As two adjacent high lift surfaces 4 are driven by a common transmission shaft 46, only one additional brake 54 is necessary for any failure case of any of the secondary units 52. The additional brake 54 may be arranged between the innermost primary drive stations 48 and 50 as shown in FIG. 3.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. A high lift system for an aircraft, comprising:
   at least one drive unit,
   a high lift surface,
   a plurality of primary drive stations, each primary drive station having a shaft connection couplable with the at least one drive unit and a primary lever couplable with the high lift surface,
   at least one secondary unit, each secondary unit having a secondary lever couplable with the high lift surface,
   wherein each one of the plurality of primary drive stations is adapted for moving the respective primary lever on driving the shaft connection,
   wherein each one of the at least one secondary unit comprises a selectively activatable brake, such that the secondary lever follows the motion of the high lift surface when the brake is deactivated and such that the secondary lever arrests the motion of the high lift surface when the brake is activated; and
   wherein the high lift surface is coupled with two individual primary drive stations of the plurality of primary drive stations, and is also coupled with one or more of the at least one secondary unit.

2. The high lift system of claim 1,
   wherein the at least one drive unit is coupled with the plurality of primary drive stations by means of a transmission shaft, and
   wherein the transmission shaft is coupled with a brake for arresting the rotation of the transmission shaft.

3. The high lift system of claim 1, wherein the high lift surface is coupled with two primary drive stations of the plurality of primary drive stations and two secondary units of the at least one secondary unit.

4. The high lift system of claim 1, wherein a secondary lever is positioned directly adjacent to a primary lever.

5. The high lift system of claim 1, wherein a group of primary drive stations, the group comprising at least two primary drive stations of the plurality of primary drive stations, comprises an individual drive unit.

6. The high lift system of claim 1,
   further comprising a controller, which is coupled with sensors for detecting at least one operation parameter of the plurality of primary drive stations or in the at least one secondary unit,
   wherein the controller is adapted for arresting a brake in at least one of the at least one secondary unit, in case the controller determines a mechanical failure based on a comparison of at least one desired operation parameter with the measured at least one operation parameter.

7. The high lift system of claim 1,
   wherein at least one of the plurality of primary drive stations is coupled with the drive unit by means of a transmission shaft, and
   wherein at least one of the at least one secondary unit comprises a through-hole, through which the transmission shaft extends.

8. An aircraft comprising:
   a wing;
   at least one high lift system, comprising:
      at least one drive unit,
      a high lift surface,
      a plurality of primary drive stations, each primary drive station having a shaft connection couplable with the at least one drive unit and a primary lever couplable with the high lift surface,
      at least one secondary unit, each secondary unit having a secondary lever couplable with the high lift surface,
      wherein each one of the plurality of primary drive stations is adapted for moving the respective primary lever on driving the shaft connection,
      wherein each one of the at least one secondary unit comprises a selectively activatable brake, such that the secondary lever follows the motion of the high lift surface when the brake is deactivated and such that the secondary lever arrests the motion of the high lift surface when the brake is activated; and
      wherein the high lift surface is coupled with two individual primary drive stations of the plurality of primary drive stations, and is also coupled with one or more of the at least one secondary unit; and
   a central drive unit located in a wing root region and a transmission shaft extending into the wing and reaching through all primary drive stations of the high lift system.

9. A method for moving a high lift surface relative to a wing of an aircraft, the method comprising the steps of:
   operating a high lift system of the aircraft, the high lift system comprising:
      at least one drive unit;
      the high lift surface;
      a plurality of primary drive stations, each primary drive station having a shaft connection couplable with the at least one drive unit and a primary lever couplable with the high lift surface; and at least one secondary unit, each secondary unit having a secondary lever couplable with the high lift surface;

wherein each one of the plurality of primary drive stations is adapted for moving the respective primary lever on driving the shaft connection;

wherein each one of the at least one secondary unit comprises a selectively activatable brake, such that the secondary lever follows the motion of the high lift surface when the brake is deactivated and such that the secondary lever arrests the motion of the high lift surface when the brake is activated; and wherein the high lift surface is coupled with two individual primary drive stations of the plurality of primary drive stations, and is also coupled with one or more of the at least one secondary unit;

driving at least one of the plurality of primary drive stations with the primary lever, until a predetermined position is reached, and activating a brake in a secondary unit of the at least one secondary unit, with the secondary lever of the secondary unit that is activated.

10. The method of claim 9, further comprising:

detecting at least one operation parameter of a primary drive station of the plurality of primary drive stations, or a secondary unit of the at least one secondary unit, determining whether at least one intended operation parameter is achieved, and arresting at least one of the at least one secondary unit in case of deviations between the at least one intended operation parameter and the measured at least one operation parameter.

* * * * *